Jan. 17, 1956 T. G. DODD 2,731,208
APPARATUS FOR DISPOSING OF CONTAMINATED WASTE
Filed Jan. 28, 1952 4 Sheets-Sheet 2
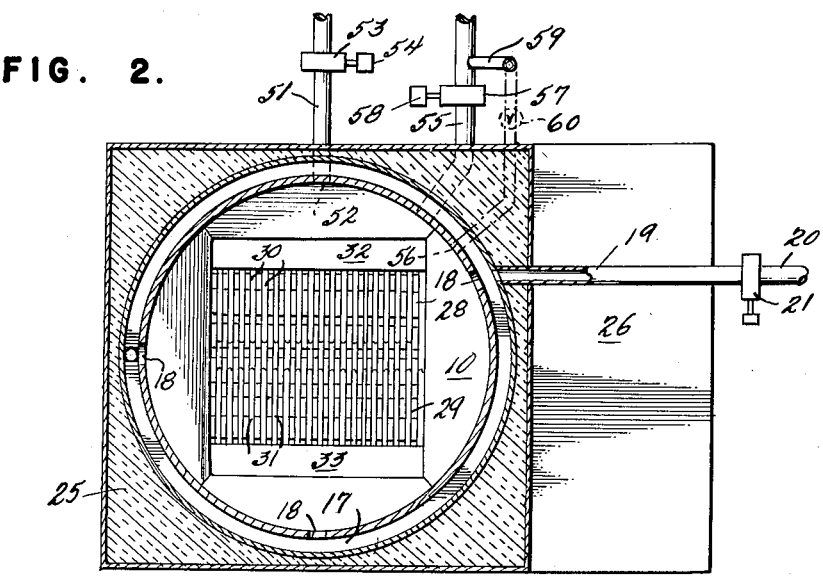
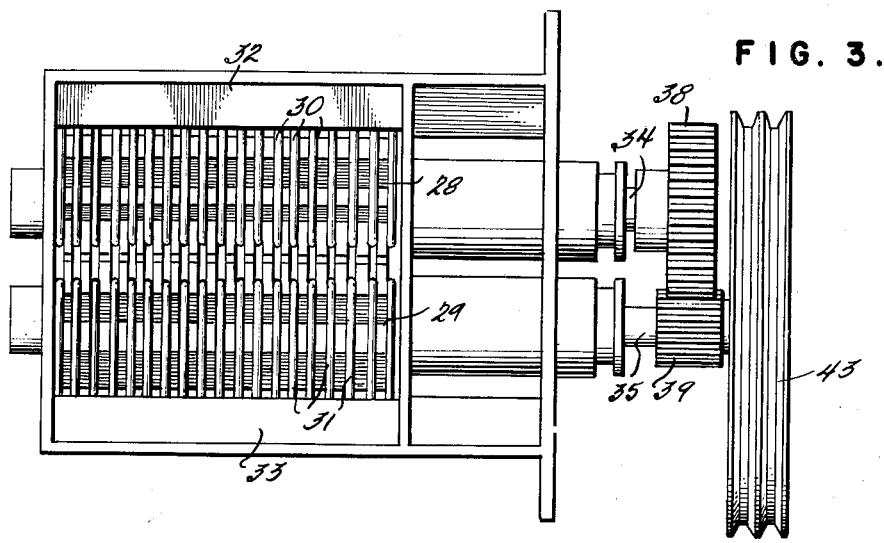
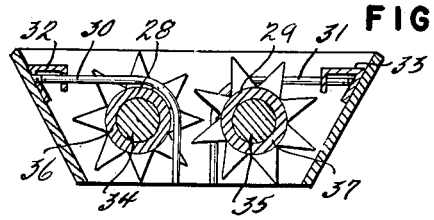
INVENTOR
THOMAS G. DODD
BY
ATTORNEY Jan. 17, 1956  T. G. DODD  2,731,208
APPARATUS FOR DISPOSING OF CONTAMINATED WASTE
Filed Jan. 28, 1952  4 Sheets-Sheet 3

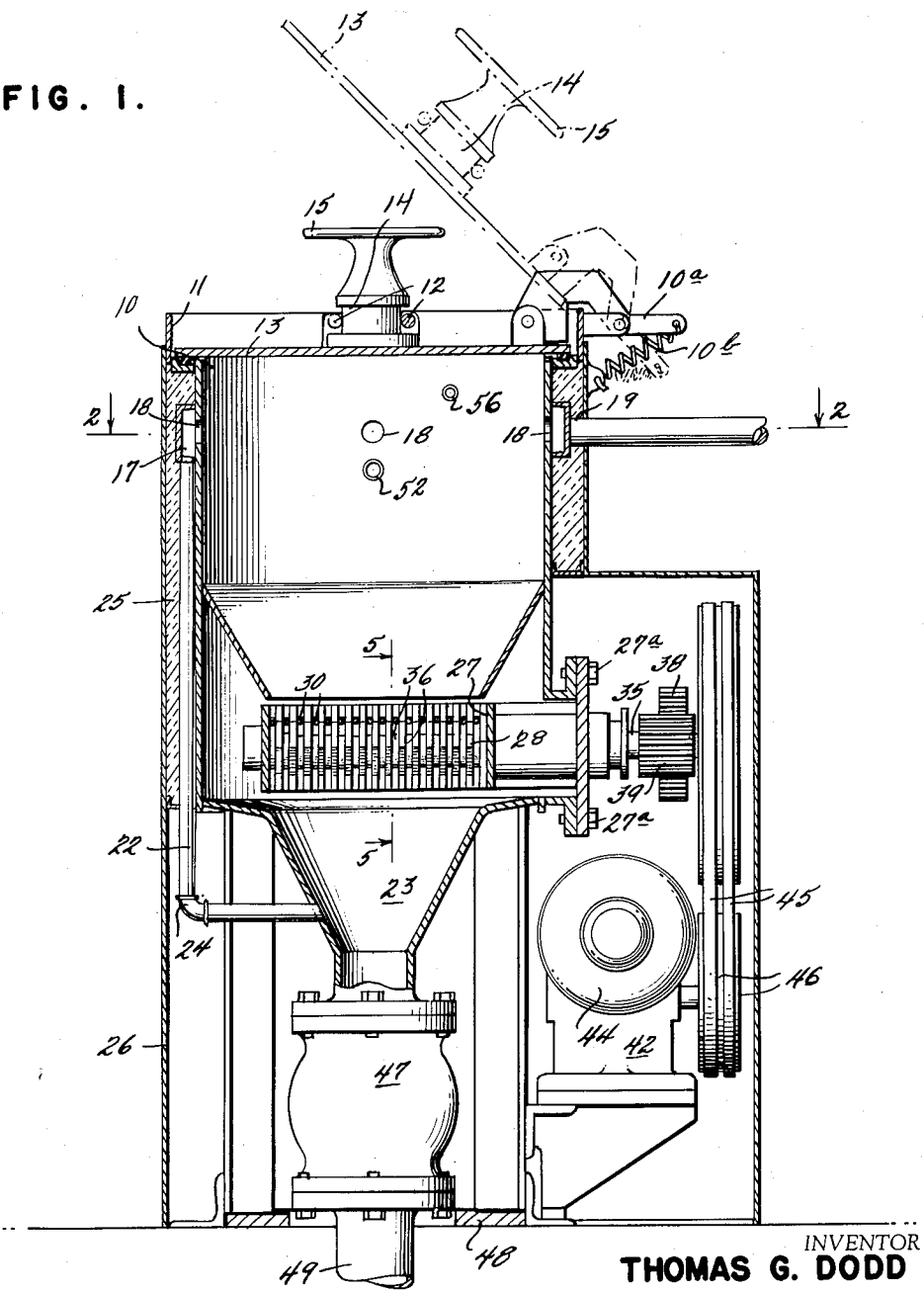

INVENTOR
THOMAS G. DODD

BY
ATTORNEY

Jan. 17, 1956 T. G. DODD 2,731,208
APPARATUS FOR DISPOSING OF CONTAMINATED WASTE
Filed Jan. 28, 1952 4 Sheets-Sheet 4
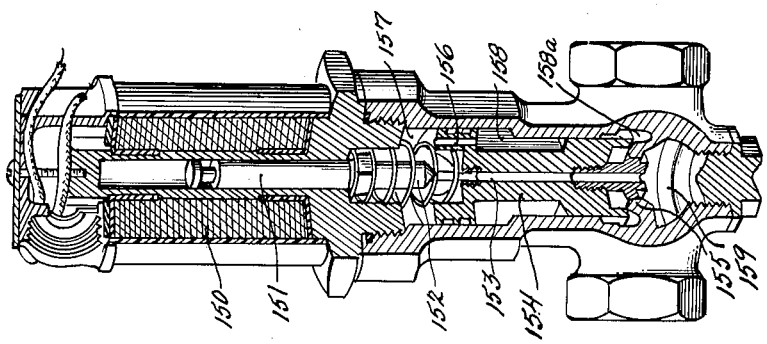
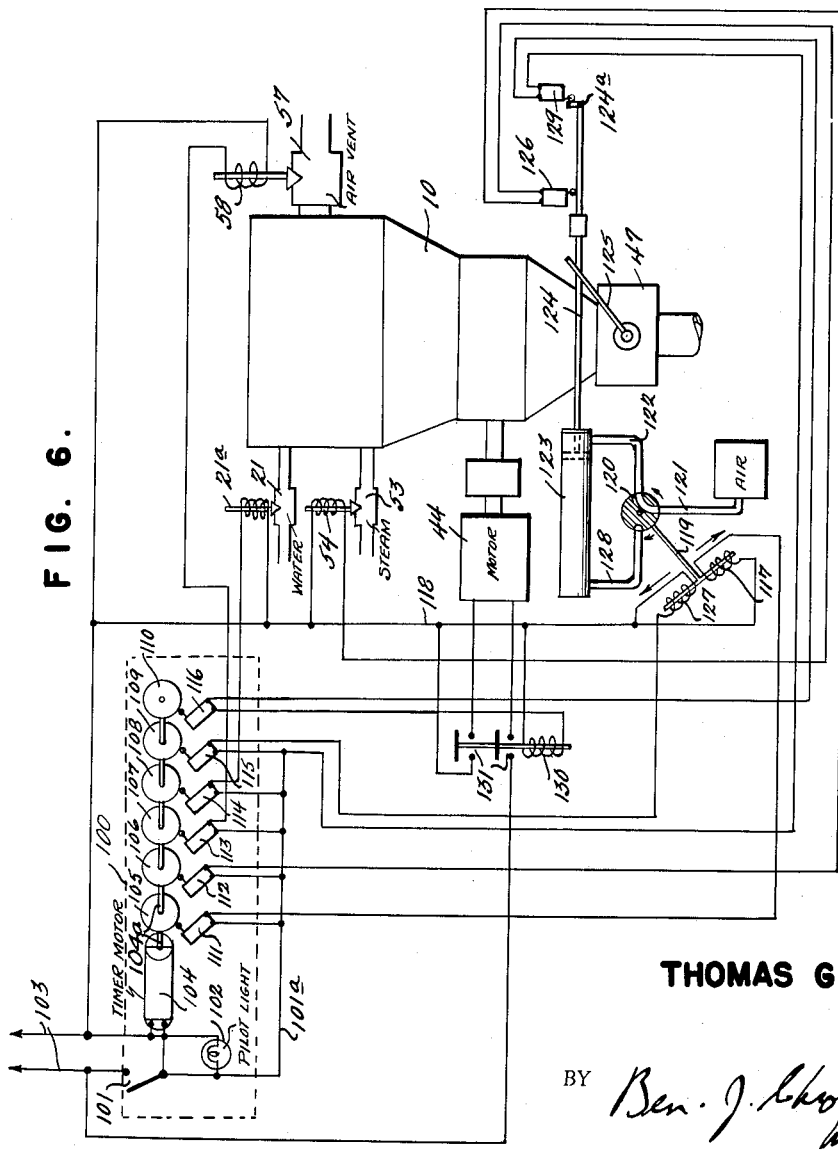
INVENTOR
THOMAS G. DODD
BY *Ben. J. Chromy*
ATTORNEY

United States Patent Office 2,731,208
Patented Jan. 17, 1956

2,731,208

APPARATUS FOR DISPOSING OF CONTAMINATED WASTE

Thomas G. Dodd, Fairfax, Va., assignor to Hospital Sanitation Equipment Corporation, Washington, D. C., a corporation of Delaware Application January 28, 1952, Serial No. 268,496

9 Claims. (Cl. 241—41)

This invention relates to an apparatus and method for disposing of contaminated waste including waste containers such as sputum cups and the like.

More particularly this invention relates to an improved apparatus and method for sterilizing and shredding contaminated waste or containers thereof such as sputum cups after they have been used.

An object of this invention is to provide an improved apparatus for sterilizing and shredding contaminated waste including paper containers such as sputum cups so that these may be washed down a sanitary waste line.

Another object of this invention is to provide an automatically controlled device for sterilizing and disposing of contaminated waste including paper containers such as used sputum cups.

Other and further objects of this invention will be apparent to those skilled in the art to which it relates from the following specification, claims and drawing:

In accordance with this invention there is provided an improved apparatus for the sterilization and disposal of contaminated waste or paper sputum cups or the like. The used sputum cups or other wastes and the containers thereof are deposited into the hopper of the machine of this invention and the cover of the hopper is then closed by the operator. The operator then presses the starter switch of the electric control incorporated in this apparatus to start the cycle of operation thereof.

Closing the starter switch connects the timer motor to an electric current supply and also causes a pilot light, which glows throughout the operating cycle, to be energized. The timer then connects the electrical control of a pneumatically operated valve that is associated with the waste pipe line, connected with the bottom of the hopper, to be energized and this valve is thereupon closed. When this valve is closed a limit switch associated therewith is tripped and a solenoid-operated valve in the steam line is caused to open so that steam under pressure is admitted into the hopper of the machine to sterilize the waste previously placed into the hopper. Another solenoid which controls a valve in the atmospheric vent line, provided to the hopper, is then energized to close this valve after the air has been exhausted from the hopper by the steam pressure.

The steam valve is allowed to be opened for a period up to 40 minutes by the timing control and during this time steam at about 35 lbs. pressure is supplied to the hopper to sterilize the waste and containers therein. At the end of the steaming cycle the steam valve is closed automatically through the operation of the solenoid control thereof and timing device and the air vent valve is opened through the operation of the solenoid control associated therewith and timing device. The gases accumulated in the hopper during the steaming period are thus allowed to escape through the air vent. At the same time the solenoid valve associated with the water supply line is energized and water is supplied to the hopper through suitable ports. Water is also supplied to the machine below the hopper and shredder knives. At this time the solenoid controlling the valve in the waste line is also energized so that this valve is opened.

When the waste line valve is completely open means associated therewith trips another limit switch which causes the motor driving the shredder knives to be energized. The shredder knives function to reduce the cups or other waste to sufficiently small particles for washing into the sanitary waste line.

When the cups and other waste have been cut up and washed down the waste line the solenoid controlling the valve in the water line is de-energized by the timer. The timer also functions to turn off the shredder motor at this time and the cycle of operation is completed. The hopper of the machine may then be opened to receive another charge of waste material to be disposed of.

Further details of this invention will be set forth in the following specification and drawing in which briefly:

Fig. 1 is a vertical sectional view of an embodiment of this machine;

Fig. 2 is a sectional view taken along the line 2—2 of Fig. 1;

Fig. 3 is a fragmentary detail view of the shredder knives;

Fig. 5 is a sectional view of the shredder knife mechanism taken along the line 5—5 of Fig. 1;

Fig. 6 is a schematic wiring diagram showing the connections of the electric controls of this apparatus, and Fig. 7 is a sectional view of an embodiment of a solenoid controlled valve employed in accordance with this invention.

Figure 4:
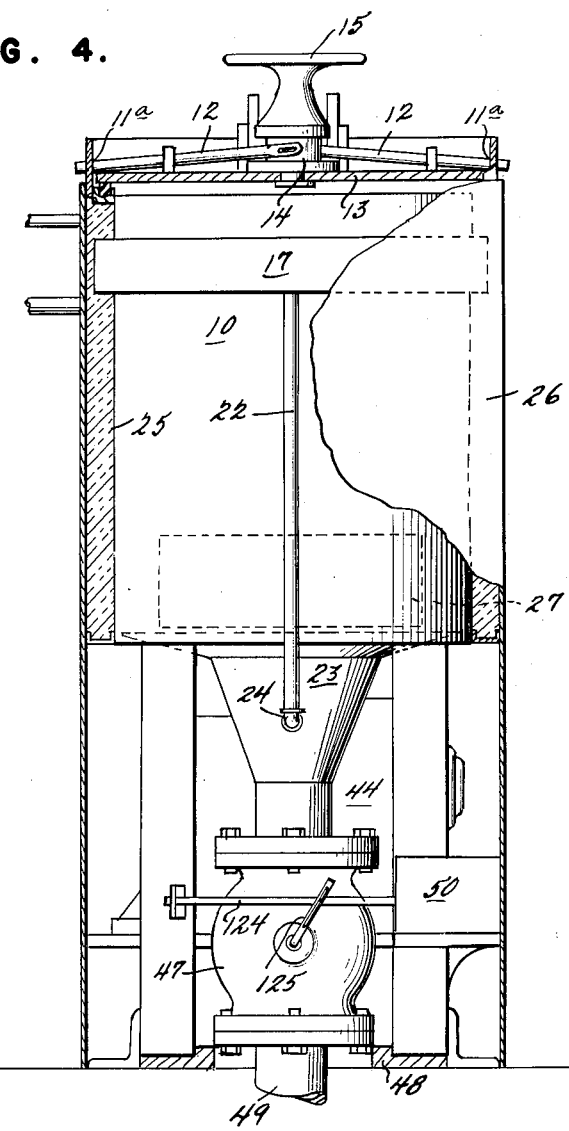
Fig. 4 is a view in side elevation of this apparatus with the cabinet partially broken away.

Referring to the drawing in detail there is shown in Fig. 1 a vertical sectional view of this apparatus. The hopper 10 is provided with a circular flange member 11 encircling the mouth thereof having a plurality of holes 11a formed therethrough for the purpose of receiving the ends of radially disposed rods 12 which are adapted to lock the cover 13 securely over the mouth of the hopper 10. The rods 12 are pivotally attached to the central member 14 and extend therefrom. When the hand wheel 15 which is threaded into this member 14 is rotated the outer ends of the rods 12 are forced into the holes 11a in the annular member 11 which is made integral with the top of the hopper 10 and encircles the mouth thereof. The rods 12 function to clamp the cover 13 securely and in air tight manner over the mouth of the hopper 10.

A water supply channel 17 is attached by welding around the exterior of the hopper 10 near the top thereof and four openings 18 are provided between this channel 17 and the inside of the hopper 10 as shown in Fig. 2. The channel 17 is connected by a pipe 19 to the water supply line 20 through the solenoid operated valve 21. Another pipe 22 is connected between the bottom chamber 23 and the channel 17 by suitable elbow 24 to feed water to this chamber when desired.

The hopper 10 is surrounded by heat insulating material 25 of asbestos or the like. A suitable cabinet 26 of sheet metal is provided around the sides of the apparatus.

Below the hopper 10 is positioned a removable box 27 this is attached to the machine housing by bolts 27a. This box contains the shredding knife units 28 and 29 and the stripping fingers 30 and 31 that are supported on the inside of the box 27 by angle members 32 and 33 respectively. The purpose of these stripping fingers is to clear shredded material from the cutting teeth of the shredding knife units so that it is not again brought around to the top of the cutters but is deposited into the waste line below. The shredding knife units 28 and 29 are supported on the shafts 34 and 35 respectively. Suitable spacer washers 36 are provided between the adjacent blades of the shredding knife unit 28 and similar spacer washers 37 are provided between the adjacent blades of the shredding knife unit 29. The spaced blades of these shredding knife units are interleaved as shown in Fig. 3 and when the blades of each unit are assembled they may be arranged with the teeth thereof staggered. These knife units may be cut out of a single block of metal on a lathe and milling machine if desired.

Meshing gears 38 and 39 are mounted on the shafts 34 and 35 respectively and the shaft 35 is provided with a pair of V-pulleys 43 which are keyed thereto. These pulleys 43 are driven through the reduction gear 42 by the motor 44 by means of the belts 45 and the pulleys 46 that are provided on the shaft of the reduction gear. Thus, the shredding knife units 28 and 29 are rotated in opposite directions. These shredding knife units 28 and 29 are also rotated at different speeds in order to produce a tearing action on materials such as paper containers.

The hopper 23 is attached to the top of the valve housing 47 and the bottom of this valve housing is attached to the waste line 49. A compressed air motor 50 is connected to the control lever 125 of the plug type valve positioned in the housing 47 for the purpose of controlling this valve as will be described hereinafter in conjunction with the description of Fig. 6.

Another pipe 51 which is provided for the purpose of supplying steam to the hopper 10 is connected to the opening 52 in this hopper. This pipe 51 may be employed for the purpose of supplying antiseptic or disinfectant fluids to the top hopper 10 instead of steam, if desired. The supply of steam through the pipe 51 is controlled by the valve 53 which is controlled by the solenoid 54. An air vent line 55 is also connected to the top hopper 10 through the opening 56. This vent line is controlled by the valve 57 that is operated by the solenoid 58. A relief vent line 59 is provided to the hopper 10 to by pass the valve 57 and this relief vent line is controlled by a manually operable valve 60.

The cover of the hopper 10 may be provided with various devices well known in the art to assist in opening it since it is of rather heavy construction. However, it has been found that attaching an arm 10a to the cover near the hinge thereof and stretching a spring 10b between the free end of this arm and the cabinet, provides sufficient assistance in the opening of the cover.

In Fig. 6 there is illustrated a schematic wiring diagram of connections employed in this apparatus. The operation of this machine is controlled by the timer 100 after the switch 101 is closed by the operator. When this switch is closed the pilot light 102 is connected to the source of electric current that is connected to the lines 103. The timer motor 104 is also connected to the lines 103 through the switch 101. This timer motor 104 is provided with a plurality of cams 105 to 110 inclusive, which are mounted on the shaft 104a and are adapted to be rotated by the motor. Switches 111 to 116 inclusive, are associated with the cams 105 to 110 inclusive, respectively and are actuated thereby. This timer may be of any suitable conventional design known in the art such as manufactured by the R. W. Cramer Co., Inc., of Center Brook, Connecticut.

The switches 111 to 116 inclusive, are preferably micro switches of the completely enclosed type and each of these switches is provided with a suitable rider for engaging the cam associated therewith in order to control the respective switch. The switch 111 is connected between the line 101a and one side of the solenoid 117, the other side of this solenoid being connected to the line 118.

When the solenoid 117 is energized by the closing of the switch 111 this solenoid pulls the arm 119 in counterclockwise direction and positions the valve 120 so that the air supply pipe 121 is connected to the pipe 122 and air under pressure is supplied to the right hand end of the cylinder 123 thereby causing the piston inside of this cylinder to be moved to the left whereupon the rod 124 connected to the piston is also moved to the left and the arm 125 is turned in counterclockwise direction thereby closing the valve 47 after the arm 125 has been rotated through an angle of 90°.

When the rod 124 actuating the valve 47 is moved to the left the projection 124a engages a limit switch 126 and closes this switch. The switch 126 is connected between one side of the solenoid 54 and the cam actuated switch 112. The other side of the solenoid 54 is connected to the line 118 and this solenoid is energized through the switches 112 and 126 when the switch 112 is closed by the cam 106 and the switch 126 is closed by the projection 124a. The solenoid 54 then opens the valve 53 in the steam line and steam is admitted to the hopper 10 of this apparatus. The steam admitted into the hopper 10 forces the air out of this hopper through the air vent. After a short time interval the air is exhausted through this vent, the timer functions to energize the solenoid 58 which closes the valve 57. One side of the solenoid 58 is connected to the cam actuated switch 113 and the other side is connected to the line 118.

Steam is admitted to the hopper 10 for a period up to 40 minutes and during the major part of this interval the air vent is kept closed. During this time the waste deposited in the hopper 10 is thoroughly sterilized and at the end of this period the steam valve 53 is closed and the air vent valve 57 is opened through the operation of the timer 100. The solenoid 21a, which controls the water line valve 21, is then connected to the current supply line by the cam actuated switch 114 to be energized to open the valve and admit water to the hopper 110. The solenoid 127 is also energized at this time through the closing of the cam actuated switch 115 and the lever 119 is turned in the clockwise direction to connect the air line 128 that is attached to the left hand end of the compressed air motor 50, to the air supply line 121. Air pressure is thus admitted to the left hand end of the motor cylinder and the piston inside of this cylinder is forced to the right thereby turning the lever 125 clockwise and opening the waste line valve.

When the waste line valve is opened by the movement of the rod 124 to the right, the projection 124a mounted on the end of the rod 124 engages the limit switch 129 and closes this switch. As a result the circuit to the motor control relay 130 is closed and the contactors 131 associated with this relay are closed. The motor 44 is thus connected to the source of current supply and the shredder of the machine is set into motion by the motor. The sterilized waste material in the hopper 10 is then cut up by the shredder and washed into the sewer through the valve 47. After all of the waste is cut up and washed into the sewer the motor 44 is disconnected and the shredder stopped through the operation of the timer motor driven cam 110 and the switch 116 controlled thereby. This switch 116 is connected in series with the solenoid of the relay 130 and the limit switch 129 and functions to interrupt the circuit of the relay 130 at the end of the shredder cycle of operation. The circuit of the solenoid 21a of the water line valve 21 is also interrupted at the end of this cycle of operation so that the valve 21 is closed and the water to the hopper 10 is cut off. The machine is then ready for another charge of waste to be placed into the hopper and the cycle of operation may be repeated.

The switches 126 and 129 may be eliminated if desired and the functions thereof may be incorporated in the microswitches 112 and 116 respectively.

In Fig. 7 there is shown a sectional view of a solenoid controlled valve which may be employed as the valves 21, 53 and 57 shown in Fig. 6. The valve shown in Fig. 7 is provided with a solenoid 150 which has associated therewith a magnetic armature 151, the bottom of which is attached to the valve 152 that normally closes the top of the passage 153. This passage 153 extends axially through the valve piston 154, the bottom of which is seated on the valve seat 155. The piston 154 is also provided with an orifice 156 that connects the chamber 157 above the piston with the chamber 158 so that fluid enters the chamber 157 from the fluid inlet 158a through the orifice 156 and pressure in both of these chambers is equalized. The inlet 158a is connected to the chamber 158 through a passageway (not shown). When the solenoid 150 is energized and lifts the armature 151 which unseats the valve 152, the fluid in the chamber 157 is allowed to flow out of this chamber through the passage 153 to the outlet passage 159 of the valve. This reduces the pressure in the chamber 157 and the fluid in the inlet chamber 158 presses the piston 154 up and unseats the valve from the seat 155 thereby opening the passage through the valve. Valves of this type are now available on the market and this valve is shown here only for purposes of explanation. Other similar valves may of course be employed.

While I have described an embodiment of this invention in detail, it is of course obvious that various modifications therein may be made without departing from the spirit and scope of this invention and therefore it is not desired to limit this invention to the exact details described and illustrated except insofar as those details are defined by the claims.

What I claim is:

1. An apparatus for sterilizing and disposing of contaminated waste or waste containers such as sputum cups and the like comprising a hopper for receiving a batch of contaminated waste, a shredder connected to the bottom of said hopper, a valve connected to the bottom of said shredder and a waste line connected to said valve, means for closing said valve and means for closing said hopper after the batch of waste has been placed therein, means for admitting steam to the closed hopper for completely sterilizing the waste therein so as to destroy virulent bacteria, means for driving said shredder for cutting up said waste after it has been sterilized, means for opening said valve to said waste line for feeding the sterilized waste to said waste line, and means for admitting water to said hopper for washing the sterilized and cut up waste into said waste line.

2. An apparatus for sterilizing and disposing of contaminated waste or waste containers such as sputum cups and the like comprising a hopper for receiving a batch of contaminated waste, a shredder connected to the bottom of said hopper, a timer mechanism, a valve connected to the bottom of said shredder and a waste line connected to said valve, electrical means associated with said timer mechanism and said valve for controlling the opening and closing of said valve, means for closing said hopper after the batch of waste has been placed therein, means controlled by the timer mechanism for admitting steam to the closed hopper for completely sterilizing the waste therein so as to destroy virulent bacteria, means for driving said shredder for cutting up said waste after it has been sterilized, means for opening said valve to said waste line for feeding the sterilized waste to said waste line, and means for admitting water to said hopper for washing the cut up waste into said waste line.

3. An apparatus for sterilizing and disposing of contaminated waste or waste containers such as sputum cups and the like comprising a hopper for receiving a batch of contaminated waste, a shredder connected to the bottom of said hopper, a valve connected to the bottom of said shredder and a waste line connected to said valve, means for closing the top of said hopper after the batch of waste has been placed therein, a timer mechanism, means for admitting steam to the closed hopper for sterilizing the waste therein, electrical means associated with said timer mechanism and said last mentioned means for timing the admission of steam to said hopper to completely destroy any virulent bacteria in said waste, means for driving said shredder for cutting up said waste after it has been sterilized, means for opening said valve to said waste line for feeding the sterilized waste to said waste line, and means for admitting water to said hopper for washing the cut up waste into said waste line.

4. An apparatus for sterilizing and disposing of contaminated waste or waste containers such as sputum cups and the like comprising a hopper for receiving a batch of contaminated waste, a shredder connected to the bottom of said hopper, a valve connected to the bottom of said shredder and a waste line connected to said valve, means for closing the top of said hopper after the batch of waste has been placed therein, a timer mechanism, means for admitting steam to the closed hopper for completely sterilizing the waste therein so as to destroy any virulent bacteria in said waste, electrical means associated with said timer mechanism and said last mentioned means for timing the admission of steam to said hopper, means controlled by said timer mechanism for driving said shredder for cutting up said waste after it has been sterilized, means for opening said valve to said waste line for feeding the sterilized waste to said waste line, and means for admitting water to said hopper for washing the cut up waste into said waste line.

5. An apparatus for sterilizing and disposing of contaminated waste or waste containers such as sputum cups and the like comprising a hopper for receiving a batch of contaminated waste, a shredder connected to the bottom of said hopper, a valve connected to the bottom of said shredder and a waste line connected to said valve, means for closing the top of said hopper after the batch of waste has been placed therein, means for admitting steam to said hopper for completely sterilizing the waste therein so as to destroy any virulent bacteria in said waste, an air vent for said hopper, means for closing said air vent after steam has been admitted to said hopper, means for driving said shredder for cutting up said waste after it has been sterilized, means for opening said valve to said waste line for feeding the sterilized waste to said waste line, and means for admitting water to said hopper for washing the sterilized and cut up waste into said waste line.

6. An apparatus for sterilizing and disposing of contaminated waste or waste containers such as sputum cups and the like comprising a hopper for receiving a batch of contaminated waste, a shredder connected to the bottom of said hopper, a valve connected to the bottom of said shredder and a waste line connected to said valve, means for sealing said hopper after the batch of waste has been placed therein, means for feeding steam under pressure substantially greater than atmospheric pressure to said hopper, timing means for said last mentioned means to control the feeding of steam to said hopper until the waste therein is completely sterilized so as to destroy any virulent bacteria in said waste, means for driving said shredder for cutting up said waste after it has been sterilized, means for opening said valve to said waste line for feeding the sterilized waste to said waste line, and means for admitting water to said hopper for washing the cut up waste into said waste line.

7. An apparatus for sterilizing and disposing of contaminated waste or waste containers such as sputum cups and the like comprising a hopper for receiving a batch of contaminated waste, a shredder connected to the bottom of said hopper, a valve connected to the bottom of said shredder and a waste line connected to said valve, a cover adapted to close and seal the top of said hopper after the waste has been placed therein, means for closing said valve, means for admitting steam to the closed hopper for sterilizing the waste therein, electrical timing means associated with said last mentioned means for timing the admission of steam to said hopper to completely sterilize said waste so as to destroy any virulent bacteria therein, means for driving said shredder for cutting up said waste containers after they have been sterilized, means for opening said valve to said waste line for feeding the sterilized waste to said waste line, and means for admitting water to said hopper for washing the cut up waste into said waste line.

8. An apparatus for sterilizing and disposing of contaminated waste or waste containers such as sputum cups and the like comprising a hopper for receiving a batch of contaminated waste, a shredder connected to the bottom of said hopper, a valve connected to the bottom of said shredder, a cover adapted to close and seal the top of said hopper after the waste has been placed therein, means for closing said valve, means for admitting steam to said hopper for completely sterilizing the waste therein while said valve is closed so as to destroy any virulent bacteria contained in said waste, means for driving said shredder for cutting up said waste after it has been sterilized, means for opening said valve for emptying the cut up sterilized waste out of the bottom of said shredder, and means for admitting water to said hopper for washing the cut up waste out of said shredder.

9. An apparatus for sterilizing and disposing of contaminated waste material including waste containers such as sputum cups and the like comprising a hopper for receiving a batch of contaminated waste material, means for reducing said waste material to small particles connected to the bottom of said hopper, a valve connected to the bottom of said means and a waste line connected to said valve, means for closing the top of said hopper after the waste has been placed therein, means for completely sterilizing the waste material in the closed hopper, said sterilization being thorough enough to destroy any virulent bacteria contained in said waste, means for operating said first-mentioned means for reducing said waste material to small particles after it has been sterilized, means for opening said valve to said waste line for feeding the sterilized waste material to said waste line, and means for admitting water to said hopper for washing the sterilized waste material into said waste line.

References Cited in the file of this patent

UNITED STATES PATENTS

| Number | Name | Date |
|---|---|---|
| 1,920,107 | Richardson | July 25, 1933 |
| 1,970,148 | Pomilio | Aug. 14, 1934 |
| 2,086,338 | Sodergreen | July 6, 1937 |
| 2,200,061 | Green | May 7, 1940 |
| 2,208,552 | Walter | July 16, 1940 |
| 2,253,657 | Smith | Aug. 26, 1941 |
| 2,257,567 | Matanovich-Manov et al. | Sept. 30, 1941 |
| 2,286,520 | Tranbarger | June 16, 1942 |
| 2,289,890 | Walter | July 14, 1942 |
| 2,509,242 | Miller et. al. | May 30, 1950 |
| 2,517,833 | Bourland | Aug. 8, 1950 |
| 2,592,705 | Jewell et al. | Apr. 15, 1952 |